United States Patent [19]

Kitoh et al.

[11] Patent Number: 4,898,630
[45] Date of Patent: Feb. 6, 1990

[54] THERMOSETTING HIGHLY FOAMING SEALER AND METHOD OF USING IT

[75] Inventors: Osamu Kitoh, Nagoya; Masahiko Ohashi, Inazawa, both of Japan

[73] Assignees: Toyota Jidosha Kabushiki; Iida Industry Co., Ltd., Japan

[21] Appl. No.: 272,285

[22] Filed: Nov. 17, 1988

[30] Foreign Application Priority Data

Nov. 18, 1987 [JP]  Japan .................. 62-291550
Dec. 25, 1987 [JP]  Japan .................. 62-331714

[51] Int. Cl.⁴ .................. B32B 31/26; B32B 31/30; B32B 5/20
[52] U.S. Cl. .................. 156/79; 52/309.5; 52/309.11; 156/151; 156/242; 156/244.24; 156/244.25; 264/46.5; 264/55; 428/213; 428/316.6; 428/317.5; 428/317.7
[58] Field of Search .......... 52/309.5, 309.11; 156/79, 150, 151, 242, 244.24, 244.25; 264/46.5, 55; 428/213, 316.6, 317.5, 317.7

[56] References Cited

U.S. PATENT DOCUMENTS

| | | | |
|---|---|---|---|
| 4,320,076 | 3/1982 | Greenwood | 156/79 X |
| 4,619,860 | 10/1986 | Brown et al. | 428/213 |
| 4,647,716 | 3/1987 | Akiyama et al. | 156/79 X |
| 4,675,231 | 6/1987 | Kia | 156/79 X |
| 4,693,772 | 9/1987 | Douglas | 156/79 |
| 4,705,584 | 11/1987 | Lauchenauer | 156/79 |
| 4,767,655 | 8/1988 | Tschudin-Mahrer | 428/316.6 X |

FOREIGN PATENT DOCUMENTS

| | | |
|---|---|---|
| 61-205109 | 9/1986 | Japan . |
| 61-205119 | 9/1986 | Japan . |
| 62-29477 | 2/1987 | Japan . |
| 62-62882 | 3/1987 | Japan . |
| 62-139739 | 6/1987 | Japan . |

Primary Examiner—Robert A. Dawson
Attorney, Agent, or Firm—Finnegan, Henderson, Farabow, Garrett & Dunner

[57] ABSTRACT

A thermosetting highly foaming sealer of this invention contains an unvulcanized rubber, a vulcanizing agent, a softener and an inorganic filler. It is bonded on one of two parallel planes forming a gap, and is vulcanized and foamed by heating to fill up the gap. A feature of the thermosetting highly foaming sealer is that it comprises a first sealing member bonded on one of two parallel planes before heating, foaming and expanding from 1 to 2 times of original volume thereof when vulcanized by heating, and a second sealing member laminated on the first sealing member foaming and expanding 6 times or more of original volume thereof when vulcanized by heating. Accordingly, the thermosetting highly foaming sealer of this invention can securely fill the gap without running down or slipping off even when it is provided on a vertical plane, thereby preventing dusts and water from intruding from environment. The thermosetting highly foaming sealer thus shows a good rustproofing capability as well..

21 Claims, 6 Drawing Sheets

Comparative Example 2

THERMOSETTING HIGHLY FOAMING SEALER AND METHOD OF USING IT

BACKGROUND OF THE INVENTION

1. Field of the Invention

This invention relates to a thermosetting highly foaming sealer for filling and sealing gaps. The thermosetting highly foaming sealer foams and fills the gaps when it is vulcanized by heating. For example, the thermosetting highly foaming sealer is used for filling an inside of a center pillar of an automobile in order to minimize wind whistles.

2. Discussion of the Background

An inside of a center pillar of an automobile is a hollow or a gap so that wind whistles may sometime generate during driving. It is effective to fill the gap in order to minimize the wind whistles. A urethane foamed substance or a rubber foamed substances is used for the purpose. The filling operation is generally performed by inserting the foamed substance into the gap through a hole for inserting the foamed substance during assembling processes.

Japanese Unexamined Patent Publication (KOKAI) No. 62882/1987 discloses a foaming sealer mainly composed of unvulcanized rubber. This foaming sealer is bonded on one of two parallel planes forming a gap, and heated at a temperature of 140° C. to 170° C. The foaming sealer is foamed and vulcanized by heating, and its volume is expanded to 1.3 to 1.6 times of the original volume. Thus, the gap is filled with the foamed foaming sealer.

Figure 17:
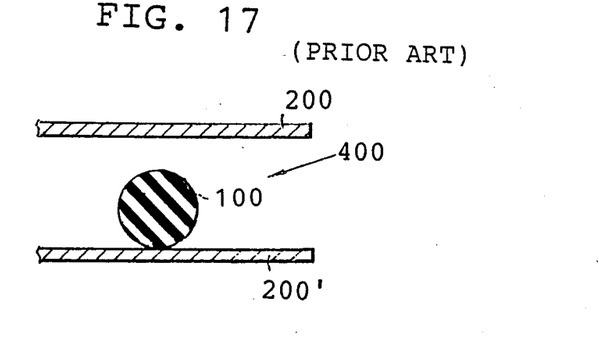
FIG. 17 is a cross-sectional view of a conventional foaming sealer provided at a position to be sealed.
Figure 18:
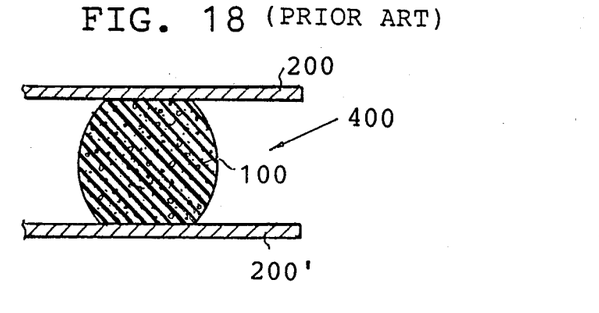
FIG. 18 is a cross-sectional view of the conventional foaming sealer provided at a location to be sealed and foamed by heating thereafter.

The foaming sealer of Japanese Unexamined Patent Publication (KOKAI) No. 62882/1987 has been known that it is appropriate for securely sealing the gap and has a good filling property. As shown in FIGS. 17 and 18, the foaming sealer 100 is used to seal a gap 400 formed between a roof 200 of an automobile body and a sun roof housing 200' of the automobile body. The unvulcanized foaming sealer 100 is provided in the gap 400 at a predetermined position. The foaming sealer is foamed and vulcanized when it is heated in a paint drying oven of an electrodeposited coating process, and the volume of the foaming sealer increases in the gap 400 to seal the gap 400. The foamed foaming sealer thus prevents dusts and water from intruding into the gap from environment.

When filling the gap with the conventional foamed substance by inserting it through the inserting hole, a filling condition of the filled gap varies depending on gap shapes. It is thus difficult to fill up the every nook and corner of the gap. Further, it is impossible to fill a confined space where no inserting hole can be provided. Furthermore, an operator may get hurt in his hands because inserting holes have edges formed by punching steel plates.

When the foaming sealer disclosed in Japanese Unexamined Patent Publication No. 62882/1987 is employed, problems mentioned above can be removed, and the confined space can also be filled up with the foaming sealer. However, this foaming sealer results in increasing material cost, because it only expands at most by a foaming magnification of 2, and because a large amount of the forming sealer is required to fill up a gap of a large space. The foaming sealer should be made thicker to fill up a gap with a large interval, but the foaming sealer with a large thickness runs down or even slips off on a vertical plane when it is bonded on the vertical plane and heated.

In addition, after the foaming sealer 100 is foamed by heating to seal the gap 400 formed between the roof 200 and the sun roof housing 200' as shown in FIGS. 17 and 18, the foaming sealer 100 comes to have many large cells in it. Accordingly, the foaming sealer 100 is likely to soak water, and steel plates of the roof 200 and the roof housing 200' in contact with the foaming sealer 100 may be rusted.

SUMMARY OF THE INVENTION

It is therefore an object of this invention to improve the foaming sealer of Japanese Unexamined Patent Publication No. 62882/1987.

It is another object of this invention to provide a thermosetting highly foaming sealer exhibiting a great foaming magnification and applicable to a vertical plane.

It is a further object of this invention to provide a thermosetting highly foaming sealer preventing dusts and water intrusion and preventing rust generation at sealing portions.

A thermosetting highly foaming sealer of this invention contains an unvulcanized rubber, a vulcanizing agent, a softener and an inorganic filler. The thermosetting highly foaming sealer is bonded on one of two parallel planes forming a gap, and is vulcanized and foamed by heating to fill up the gap. The thermosetting highly foaming sealer comprises a first sealing member, bonded on one of two parallel planes before heating, foaming and expanding from 1 to 2 times of original volume thereof when vulcanized by heating, and a second sealing member laminated on the first sealing member foaming and expanding 6 times or more of original volume thereof when vulcanized by heating.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 4:
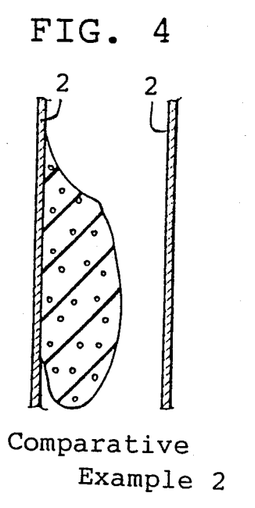
FIG. 4 is a cross-sectional view of a thermosetting highly foaming sealer according to Comparative Example 2 bonded on one of two parallel planes and foamed thereafter.

The present inventors found a composition exhibiting a foaming magnification of 6 or more by deliberately researching compositions containing an unvulcanized rubber, vulcanizing agent, softener and an inorganic filler. However, a sealer comprising the composition ran down or even slipped off on a vertical plane as shown in FIG. 4 when it is bonded on the vertical plane, heated and foamed. Thus, it was apparent that no sufficient filling condition could be obtained with the sealer comprising the composition. It is believed that the insufficient filling condition results from the following fact: The sealer is highly foamed so that area of the sealer contacting with the bonded plane reduces during the foaming. Accordingly, the problem has been overcome by laminating the first sealing member and the second sealing member in the thermosetting highly foaming sealer of this invention.

The first sealing member comprises a composition foaming and expanding 1 to 2 times of original volume thereof when vulcanized by heating. The composition may be the following well known composition: from 30 to 40% by weight of unvulcanized rubber, from 2 to 3% by weight of vulcanizing agent, from 20 to 30% by weight of softener, from 0 to 3% by weight of foaming agent and from 30 to 40% by weight of inorganic filler. The composition for the first sealing member is so arranged that it expands 1 to 'times of the original volume thereof, because area of the first sealing member contacting with one of two parallel planes decreases and the first sealing member runs down on a vertical plane due to reduced bonding force when the first sealing member foams and expands more than twice of the original volume thereof. Here, 1 time means a condition that the first sealing member is not foamed at all. It is preferred that the first sealing member foams and expands virtually 2 times of the original volume thereof to satisfy the weight and cost reduction requirements.

For the unvulcanized rubber, a natural rubber or synthetic rubbers may be employed. It is preferred to select at least one unvulcanized rubber from the group consisting of natural rubber (NR), isoprene rubber (IR), styrene-butadiene rubber (SBR), butadiene rubber (BR), chloroprene rubber (CR), isobutylene-isoprene rubber (IIR), ethylene-propylene rubber (EPM or EPDM), chlorosulphonated polyethylene rubber (CSM) and silicone rubber (Q). The first sealing member employing the natural rubber or synthetic rubbers mentioned above have a good affinity with oils, and exhibits an improved adhesive property toward a steel plate with oils deposited thereon (hereinafter referred to as a steel plate with oily surfaces).

The first sealing member is formed into a sheet shape, a film shape or a tape shape. The thickness of the first sealing member is not explicitly determined, but it is preferred to be thinner to satisfy the weight and cost reduction requirements.

For the vulcanizing agent, it is preferred to employ a vulcanizing agent not working at ordinary temperatures but working when heated. For instance, it is more preferred to mix such a vulcanizing agent like sulfur compounds with a vulcanization accelerating agent like thiazole compounds. Thus, such a mixture does not react at ordinary temperatures, but reacts and generates sulfur for vulcanizing the unvulcanized rubber when heated to temperatures of 140° C. to 170° C.

For the softener, a well known oil like a mineral oil or a vegetable oil may be employed.

For the foaming agent, a substance decomposing in a temperature range substantially identical to the reaction temperature range of the vulcanizing agent mentioned above. For instance, azodicarbonamide or dinitroso pentamethylene tetramine may be employed. A foaming assistance agent like urea may be used with the foaming agent in order to accelerate decomposition of the foaming agent.

The inorganic filler works as an increaser. For the increaser, talc, calcium carbonate, silica or barium sulfate may be employed as in the conventional sealer.

The second sealing member comprises a composition foaming and expanding 6 times or more of original volume thereof when vulcanized by heating. The composition may be the following in order to achieve the expansions from 25 to 40% by weight of unvulcanized rubber, from 2 to 3% by weight of vulcanizing agent, from 25 to 40% by weight of softener, from 1 to 10% by weight of foaming agent and from 15 to 30% by weight of inorganic filler. When the second sealing member does not expand 6 times or more of the original volume thereof, the weight and cost reduction requirements are not fully satisfied. In addition, it is hard to fill a large gap with a sealer having a second sealing member not expanding 6 times or more of the original volume thereof.

For the unvulcanized rubber of the second sealing member, the same rubbers described for the first sealing member may be employed. With this arrangement, the running down of a sealer on a vertical plane is further prevented because the second sealing member exhibits a good affinity with the first sealing member and an improved bonding force with respect to the first sealing member. In addition, if the second sealing member is not directly bonded on the steel plate with oil surfaces, a rubber having less affinity with oils may be employed for the second sealing member. Such a rubber having less affinity with oils may be nitrile rubber (NBR), epichlorohydrin rubber (CO or ECO), acrylic rubber (ACM), urethane rubber (U) and fluoroelastomer (FKM).

For the softener, a high viscosity one is employed. The conventional softeners have a very low viscosity: They exhibit a very low viscosity of about 20 cps. at 100° C. Accordingly, a sealer containing the conventional softener cannot be highly foamed because the sealer has a low viscosity when heated, and gas generated breaks up a film and escapes to environment. On the other hand, the softener for the second sealing member of this invention employs a high viscosity softener which exhibits a viscosity of 1000 cps. or more at 20° C. and 30 cps. or more at 100° C. Thus, the second sealing member can be highly foamed because it has a sufficient viscosity when heated so that the film growth is developed.

For the vulcanizing agent, the vulcanization accelerating agent and the foaming agent, the same ones employed for the first sealing member may be employed. It is preferred to use a foaming assistance agent in order to further foam the second sealing member.

For the inorganic filler, the same inorganic filler used for the first sealing member may be employed. But it is preferred to employ an inorganic filler not obstructing flow of the rubber when heated. In other word, it is preferred to employ a nodular shaped inorganic filler having a particle size of from 1 to 10 micrometers.

A thickness ratio of the first sealing member to the second sealing member is not defined especially. But it is preferred to make a thickness of the first sealing member half or less of the second sealing member to satisfy the weight and cost reduction requirements.

The non-foaming or low-foaming first sealing member of the thermosetting highly foaming sealer according to this invention is bonded on one of two parallel planes forming the gap. Generally, the first sealing member is bonded on the plane by its stickiness resulting from the unvulcanizing rubber, but it may sometimes be bonded on the plane with an adhesive or a double-sided adhesive tape. The second sealing member is laminated on the first sealing member, and foams and expands 6 times or more of the original volume thereof when heated.

Accordingly, when heating the thermosetting highly foaming sealer according to this invention bonded on one of two parallel planes, mainly the second sealing member foams to a high extent and fills the gap. At the same time, the unvulcanized rubbers contained in the first and second sealing members are vulcanized. Here, the area of the first sealing member contacting with one of two parallel planes can be kept large, and the thermosetting highly foaming sealer does not run down or slip off even on a vertical plane, because the first sealing member is the non-foaming or low-foaming one. Further, bonding strength between the first and second sealing members is maintained in a high degree even when the second sealing member foams highly and contacting area between the first and second sealing members decreases, because the first and second sealing members have similar compositions containing unvulcanized rubbers. In this way, running down or slipping off of the second sealing member on the first sealing member has been prevented from occurring.

Thus, the thermosetting highly foaming sealer according to this invention can securely fill the gap without running down or slipping off even when it is provided on a vertical plane. With the thermosetting highly foaming sealer, further reductions in weight and cost can be achieved because the thermosetting highly foaming sealer foams highly and even fills a gap with wide intervals. Furthermore, a confined space, which has been hard to fill, can be filled with the thermosetting highly foaming sealer.

By bonding the thermosetting highly foaming sealer according to this invention on parallel planes forming a gap when forming an automobile body, it can foam and fill the gap simultaneously with a drying process in an electrodeposited coating line. In this way, it is possible to save thermal energy.

The area of the first sealing member contacting with a surface of a steel plate is kept in a high degree even after foaming, and the high foaming second sealing member foams and fills the gap, thereby preventing dusts and water from intruding from environment. When both of two parallel planes made of a steel plate are electrodeposited-coated, the first sealing member directly contacts with the steel plate and the second sealing member contacts with an electrodeposited-coated surface. Accordingly, the surface of the steel plate contacting with the first sealing member tends to rust because no coating is formed on the surface contacting with the first sealing member. However, in this invention, rust generation is suppressed when compared with the conventional foaming sealer because the first sealing member is non-foaming or low-foaming so that it is less likely to soak water. When both of two parallel planes made of a steel plate are electrodeposited-coated, a sandwiched arrangement is preferred in which one second sealing member is placed between two first sealing members. With this arrangement, a portion of the steel plate contacting with the thermosetting highly foaming sealer will not rust with water soaked in the second sealing member. The thermosetting highly foaming sealer of this invention thus shows a good rustproofing capability.

In addition, adhesive property to the steel plate with oily surfaces can be attained by selecting an unvulcanized rubber from the unvulcanized rubbers mentioned above, whereby making the thermosetting highly foaming sealer providing operation easier and further preventing rust generation.

Moreover, by employing the thermosetting highly foaming sealer according to this invention, the light weight and cost reduction requirements can be satisfied because a required amount of the thermosetting highly foaming sealer has been reduced remarkably when compared with the case where the gap is filled only with the conventional non-foaming sealer or low foaming sealer. Additionally, the high foaming second sealing member works as a buffer, relieves shocks exerted from outside and prevents the thermosetting highly foaming sealer from coming off the steel plates. In this way, the thermosetting highly foaming sealer can effectively prevent dusts and water from intruding from environment.

Having generally described this invention, a further understanding can be obtained by reference to certain specific preferred embodiments which are provided herein for purposes of illustration only and are not intended to be limiting unless otherwise specified. Percentage values hereinafter mean percentages by weight.

FIRST PREFERRED EMBODIMENT

1. Preparation of a Composition for the First Sealing Member

The following were mixed to obtain a composition for the first sealing member: 35% of unvulcanized butadiene rubber, 25% of process oil as the softener, 1% of azodicarbonamide as the foaming agent, 36% of calcium carbonate as the inorganic filler, 2% of tetramethyl thiuram disulfide as the vulcanizing agent and 1% of N-cyclohexyl-2-benzothiazole sulfenamide as the vulcanizing accelarating agent.

This composition foams and expands approximately 1.2 times of the original volume when it is heated and vulcanized at 140° C. to 215° C.

2. Preparation of a Composition for the Second Sealing Member

The following were mixed to obtain a composition for the second sealing member: 35% of unvulcanized styrene-butadiene rubber, 25% of process oil having a viscosity of 60 cps. at 100° C. as the softener, 5% of azodicarbonamide as the foaming agent, 5% of urea as the foaming assistance agent, 26% of calcium carbonate as the inorganic filler, 2% of tetramethyl thiuram disulfide as the vulcanizing agent and 2% of N-cyclohexyl-2-benzothiazole sulfenamide as the vulcanizing accelerating agent.

This composition foams and expands approximately 8.5 times of the original volume when it is heated and vulcanized at 140° C. to 215° C.

3. Thermosetting Highly Foaming Sealer Formation

Figure 1:
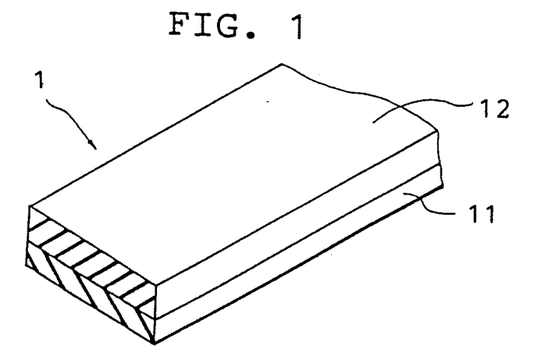
FIG. 1 is a perspective view of a thermosetting highly foaming sealer according to a preferred embodiment of this invention.

The first sealing member composition and the second sealing member composition were processed by the two-color (two-layer) extrusion molding to form a sheet-shaped thermoserting highly foaming sealer 1 as shown in FIG. 1. The thickness of the first sealing member 11 formed out of the first sealing member composition was 2 mm, and the thickness of the second sealing member 12 formed out of the second sealing member composition was 3 mm. The first sealing member 11 and the second sealing member 12 were bonded closely and integrally by the bonding force of the unvulcanized butadiene rubber and styrene-butadiene rubber.

4. Evaluation

Figure 2:
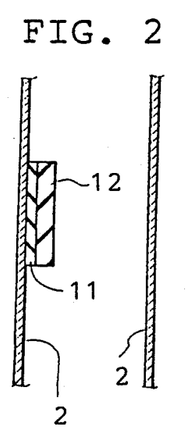
FIG. 2 is a cross-sectional view of a thermosetting highly foaming sealer according to a preferred embodiment of this invention bonded on one of two parallel planes.

The thermosetting highly foaming sealer 1 was cut to a length of 50 mm and a width of 50 mm, and bonded on one of two steel plates 2 with oily surfaces as shown in FIG. 2. The steel plates were disposed parallel so as to form a gap of 20 mm. The thermosetting highly foaming sealer 1 was closely bonded on a steel plate 2 by the bonding force of the first sealing member 11 even when oils existed on the steel plate 2.

Figure 3:
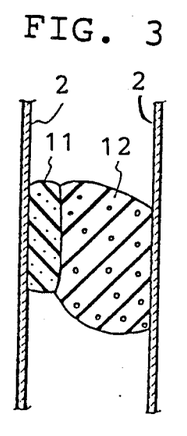
FIG. 3 is a cross-sectional view of a thermosetting highly foaming sealer according to a preferred embodiment of this invention bonded on one of two parallel planes and foamed thereafter.

Then, the two steel plates parallel disposed were erected in a perpendicular manner, and heated at 180° C. for 30 minutes. The first sealing member 11 and the second sealing member 12 were vulcanized and foamed by the heating. The thermosetting highly foaming sealer 1 thus fills the gap of 20 mm between the two steel plates 2 with oil surfaces as shown in FIG. 3. The first sealing member 11 and the second sealing member 12 did not run down nor slip off the steel plates 2 even during the heating.

SECOND PREFERRED EMBODIMENT

This preferred embodiment employed the same arrangement as that of the first preferred embodiment other than the following: The percentage of the foaming agent of the composition for a first sealing member 11 of this preferred embodiment was increased to 2% to expand 1.6 times of the original volume, and a thermosetting highly foaming sealer 1 was molded out of the compositions so that a sheet-shaped thermosetting highly foaming sealer 1 had a first sealing member of 1 mm thickness and a second sealing member of 3 mm thickness.

The thermosetting highly foaming sealer 1 of the second preferred embodiment was evaluated by the same method as described in the First Preferred Embodiment section. Although the thermosetting highly foaming sealer 1 of this second preferred embodiment was lighter than that of the first preferred embodiment, it also filled the gap of 20 mm without failure and did not run down nor slip off.

COMPARATIVE EXAMPLE 1

Only the composition for the first sealing member 11 of the thermosetting highly foaming sealer 1 of the second preferred embodiment was employed and molded into a sheet-shaped and one-layered thermosetting foaming sealer having a thickness of 5 mm, and this Comparative Example 1 was also evaluated by the same method as described in the First Preferred Embodiment section. Comparative Example 1 did not run down on the steel plate with oil surfaces, but did not fill the gap of 20 mm because it expanded at a less foaming magnification.

COMPARATIVE EXAMPLE 2

Only the composition for the second sealing member 12 of the thermosetting highly foaming sealer 1 of the second preferred embodiment was employed and molded into a sheet-shaped and one-layered thermosetting foaming sealer having a thickness of 5 mm, and this Comparative Example 2 was also evaluated by the same method as described in the First Preferred Embodiment section. As shown in FIG. 4, Comparative Example 2 ran down and slipped off the steel plate with oil surfaces, and it did not fill the gap of 20 mm completely.

THIRD PREFERRED EMBODIMENT

Figure 5:
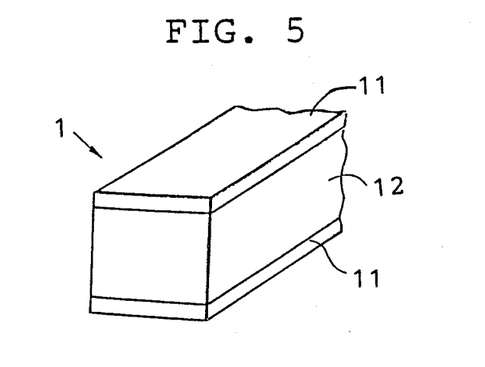
FIG. 5 is a perspective view of a thermosetting highly foaming sealer of a third preferred embodiment according to this invention.
Figure 6:
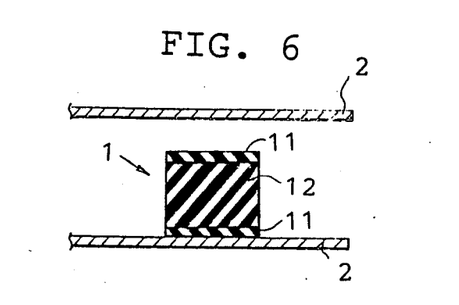
FIG. 6 is a cross-sectional view of the thermosetting highly foaming sealer of the third preferred embodiment according to this invention provided at a position to be sealed.
Figure 7:
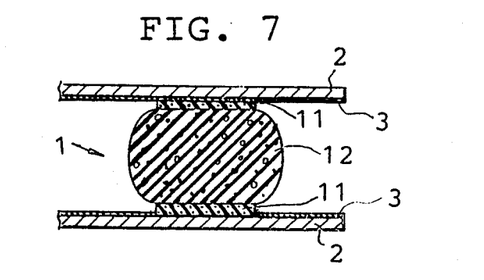
FIG. 7 is a cross-sectional view of the thermosetting highly foaming sealer of the third preferred embodiment according to this invention provided at a position to be sealed and foamed by heating thereafter.
Figure 8:
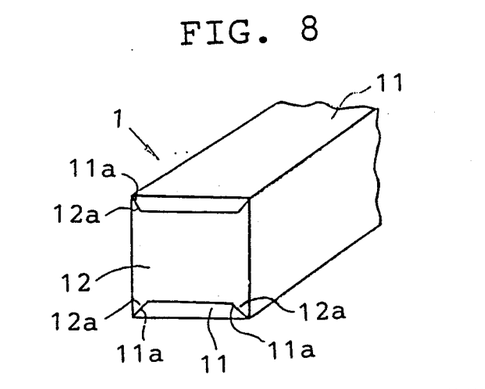
FIG. 8 is a perspective view of a thermosetting highly foaming sealer of a fourth preferred embodiment according to this invention.
Figure 9:
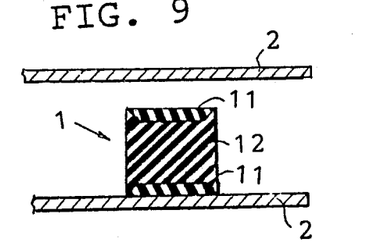
FIG. 9 is a cross-sectional view of the thermosetting highly foaming sealer of the fourth preferred embodiment according to this invention provided at a position to be sealed.

FIGS. 5 through 7 illustrate a thermosetting highly foaming sealer 1 according to the third preferred embodiment of this invention. The thermosetting highly foaming sealer 1 is formed into a longitudinally long tape-shaped one having a constant width and a square cross-section. The thermosetting highly foaming sealer 1 has non-foaming first sealing members 11, 11 having a thin-plate-shaped cross-section, and a high foaming second sealing member 12 having a rectangular cross-section and sandwiched in close contact with the first sealing members 11, 11 between a bottom surface of the upper first sealing member 11 and the top surface of the lower first sealing member 11.

The first sealing member 11 was composed of 30% of butadiene rubber, 20% of process oil, 45% of calcium carbonate and 5% of vulcanizing agent. The second sealing member 12 was composed of 30% of butadiene rubber, 20% of process oil, 44% of calcium carbonate and 5% of vulcanizing agent and 1% of foaming agent.

The composition for the first sealing member 11 was molded into the first sealing member 11 having a thickness of 1 mm, and the composition for the second sealing member 12 was molded into the second sealing member 12 having a thickness of 8 mm. The bottom surface of the upper first sealing member 11 and the top surface of the lower first sealing member 11 were respectively brought into close with the top surface and the bottom surface of the second sealing member 12. The thermosetting highly foaming sealer 1 was thus formed into a tape-shaped one having a thickness of 10 mm and a width of 10 mm. For comparison, Comparative Example 3 was prepared only by using the composition for the second sealing member 12 of this preferred embodiment. The composition was molded into a tape-shaped foaming sealer having a thickness of 10 mm and a width of 10 mm.

Then, two testpieces were prepared. The testpieces comprised a pair of two parallelly disposed steel plates 2, 2 forming a gap of an interval of 13 mm. The thermosetting highly foaming sealer 1 according to the third preferred embodiment was provided in one of the two testpieces, and Comparative Example 3 was provided in the other testpiece. After conducting the electrodeposited coating on the two testpieces and foaming the sealers by the heat for heating and drying the electrodeposited-coating 3, a salt water spray test was conducted on the two testpieces for 500 hours. The sealers were removed off the testpieces to examine whether rust had generated on the steel plates 2, 2. According to the examination, no rust had generated on the steel plates 2, 2 of the testpiece in which the thermosetting highly foaming sealer 1 according to the third preferred embodiment was provided, but rust had generated on the steel plates 2, 2 of the testpiece in which Comparative Example 3 was provided.

The thermosetting highly foaming sealer 1 according to the third preferred embodiment thus prevented the rust generation because the portions of the second sealing member 12 to be in contact with the steel plates 2, 2 were coated with the non-foaming first sealing members 11, 11 less likely to soak water. This arrangement of the third preferred embodiment is also effective even when a second sealing member 12 with a high foaming magnification is employed to completely fill up the gap, because water soaked in the second sealing member 12 with a high foaming magnification does not come into contact with the steel plates 2, 2.

FOURTH PREFERRED EMBODIMENT

FIGS. 8 through 11 illustrate a thermosetting highly foaming sealer 1 according to the fourth preferred embodiment of this invention. The thermosetting highly foaming sealer 1 had a non-foaming first sealing members 11, 11 and a high foaming second sealing member 12. The first sealing members 11, 11 and the second sealing member 12 employed the same compositions as those of the first sealing members 11, 11 and the second sealing member 12 of the thermosetting highly foaming sealer 1 according to the third preferred embodiment. The first sealing members 11, 11 had a thickness of 1 mm and chamfered portions 11a, 11a at both sides. The first sealing members 11, 11 were thus formed into ones having a trapezoid-shaped crosssection. The second sealing member 12 was formed so that it had a thickness of 8 mm at the middle portion thereof and has projections 12a, 12a, whose thickness or height increased toward outsides thereof, engaging the chamfered portions 11a, 11a of the first sealing members 11, 11. The first sealing members 11, 11 having the trapezoid-shaped cross-section were integrally bonded on the top and bottom surfaces of the second sealing member 12. Thus, as a whole, the thermosetting highly foaming sealer 1 according to the fourth preferred embodiment were formed to have a square cross-section having a thickness of 10 mm and a width of 10 mm.

Figure 10:
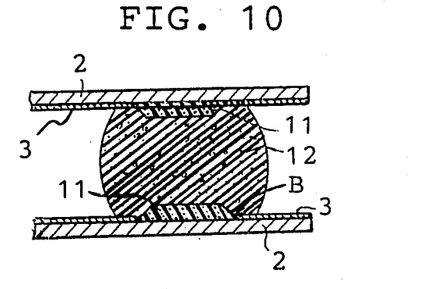
FIG. 10 is a cross-sectional view of the thermosetting highly foaming sealer of the fourth preferred embodiment according to this invention provided at a position to be sealed and foamed by heating thereafter.
Figure 11:
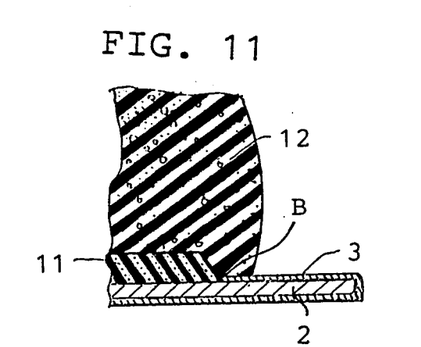
FIG. 11 is an enlarged view of major portions of FIG. 10.
Figure 12:
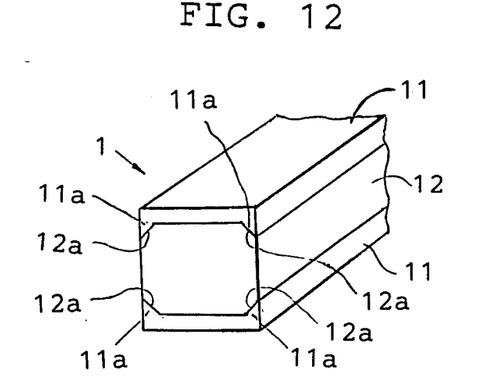
FIG. 12 is a perspective view of a modified embodiment based on the fourth preferred embodiment.
Figure 13:
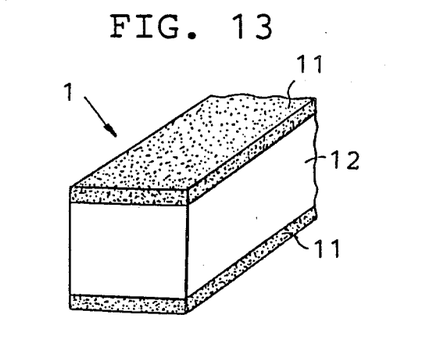
FIG. 13 is a perspective view of a thermosetting highly foaming sealer of a fifth preferred embodiment according to this invention.
Figure 14:
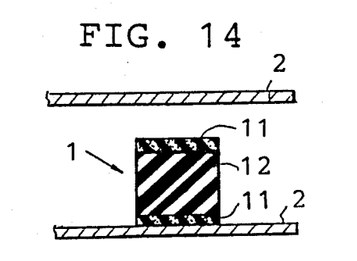
FIG. 14 is a cross-sectional view of the thermosetting highly foaming sealer of the fifth preferred embodiment according to this invention provided at a position to be sealed.

The thermosetting highly foaming sealer 1 thus arranged was provided in a gap formed by the parallel disposed two steel plates 2, 2 and on one of the two steel plates 2, 2, and the electrodeposited coating was conducted. After the electrodeposited coating, the thermosetting highly foaming sealer 1 was foamed by the heat for heating and drying the electrodeposited-coating 3 to fill and seal the gap formed between the two steel plates 2, 2. When foaming, the second sealing member 12 of the thermosetting highly foaming sealer 1 expanded toward the upper and lower steel plates 2, 2 as well as toward the width direction of itself, i.e. it expanded vertically as well as horizontally as shown in FIG. 10. Intruding water tends to remain at a boundary "B" between the first sealing member 11, 11 and the electrodeposited-coating 3, and as a result the boundary "B" is most likely to rust. However, in this fourth preferred embodiment, the horizontally expanded portions of the second sealing member 12 of the thermosetting highly foaming sealer 1 covered the boundary "B" to prevent water from intruding into the boundary "B" as shown in FIG. 11 and to suppress rust generation at the boundary "B". Thus, the thermosetting highly foaming sealer 1 according to the fourth preferred embodiment prevented the portions of the steel plates 2, 2 in contact with the thermosetting highly foaming sealer 1 from rusting as the same manner done by the thermosetting highly foaming sealer 1 according to the third preferred embodiment, and could effectively prevent the boundary "B" from rusting. FIG. 12 illustrates a modified embodiment based on this fourth preferred embodiment devised to further improve the rust proofing capability. A second sealing member 12 of a thermosetting highly forming sealer 1 according to this modified embodiment has chamfered portions 12a at side ends thereof, and a first sealing member 11 of the thermosetting highly forming sealer 1 according to this modified embodiment has protruding walls 11a at side ends thereof engaging the chamfered portions 12a. When the thermosetting highly foaming sealer 1 is foamed, the second sealing member 12 foams to push and bring the protruding walls 11a of the first sealing member 11 into contact with the electrodeposited-coated surface of the steel plates 2, 2, thereby further suppressing rust generation at the boundary "B".

FIFTH PREFERRED EMBODIMENT

FIGS. 13 through 16 illustrate a thermosetting highly foaming sealer 1 according to the fifth preferred embodiment of this invention. The thermosetting highly foaming sealer 1 had a non-foaming first sealing members 11, 11 and a high foaming second sealing member 12. The first sealing members 11, 11 and the second sealing member 12 employed the same compositions as those of the first sealing members 11, 11 and the second sealing member 12 of the thermosetting highly foaming sealers 1 according to the third and fourth preferred embodiments. However, in this fifth preferred embodiment, either the first sealing members 11, 11 or the second sealing member 12 were colored or subjected to a carbon removing to enable distinguishing one from the other visually. This arrangement was intended to prevent an operator from providing the thermosetting highly foaming sealer 1 in failure orientation. For instance, carbon black was added as an coloring agent in the composition for the first sealing members 11, 11, and the composition for the second sealing member 12 was used as it is in the thermosetting highly foaming sealer 1 according to the fifth preferred embodiment.

Figure 15:
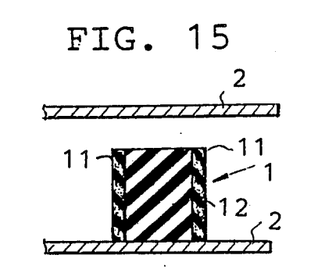
FIG. 15 is a cross-sectional view of the thermosetting highly foaming sealer of the fifth preferred embodiment according to this invention provided in failure orientation.
Figure 16:
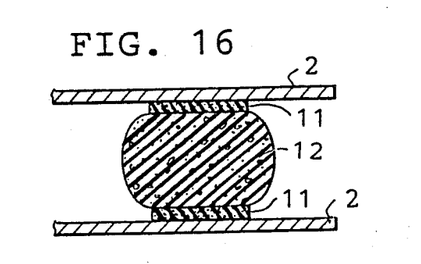
FIG. 16 is a cross-sectional view of the thermosetting highly foaming sealer of the fifth preferred embodiment according to this invention provided at a position to be sealed and foamed by heating thereafter.

As a result, the first sealing members 11, 11 could be identified at once because the surface color of the first sealing members 11, 11 was blacker than the surface color of the second sealing member 12. Thus, when one of the first sealing members 11, 11 is provided in contact with one of the two parallel disposed steel plates 2, 2, the thermosetting highly foaming sealer 1 can be provided so that it fully accomplishes the intended rust preventing performance. In addition, man-hour requirement and operation time can be reduced because it is possible to eliminate the thermosetting highly foaming sealer 1 provided in the failure orientation as shown in FIG. 15.

Further, for the third, fourth and fifth preferred embodiments described above, a low foaming first sealing member 11 having independent cells may be employed instead of the non-foaming first sealing member 11.

Furthermore, in the above preferred embodiments, the sheet-shaped or tape-shaped thermosetting highly foaming sealers 1 having the rectangular or square cross-section have been described, but the cross-sections of the thermosetting highly foaming sealers 1 can be made into ones other than described above.

Having now fully described the invention, it will be apparent to one of ordinary skill in the art that many changes and modifications can be made thereto without departing from the spirit or scope of the invention as set forth herein.

What is claimed is:

1. A thermosetting highly foaming sealer containing an unvulcanized rubber, a vulcanizing agent, a softener and an inorganic filler bonded on one of two parallel planes forming a gap, vulcanized and foamed by heating to fill up said gap comprising:
   a first sealing member bonded on one of two parallel planes before heating, foaming and expanding from 1 to 2 times of original volume thereof when vulcanized by heating; and
   a second sealing member laminated on said first sealing member, foaming and expanding 6 times or more of original volume thereof when vulcanized by heating.

2. A thermosetting highly foaming sealer according to claim 1, wherein said thermosetting highly foaming sealer has an adhesive property toward oily planes.

3. A thermosetting highly foaming sealer according to claim 2, wherein said first sealing member sealer has an adhesive property toward oily planes.

4. A thermosetting highly foaming sealer according to claim 1, wherein said first sealing member and said second sealing member contain a same kind of unvulcanized rubber.

5. A thermosetting highly foaming sealer according to claim 1, wherein said unvulcanized rubber contained in said first sealing member is one selected from the group consisting of natural rubber (NR), isoprene rubber (IR), styrene-butadiene rubber (SBR), butadiene rubber (BR), chloroprene rubber (CR), isobutylene-isoprene rubber (IIR), ethylene-propylene rubber (EPM or EPDM), chlorosulphonated polyethylene rubber (CSM) and silicone rubber (Q).

6. A thermosetting highly foaming sealer according to claim 1, wherein said unvulcanized rubber contained in said second sealing member is a rubber having less affinity with oils.

7. A thermosetting highly foaming sealer according to claim 6, wherein said unvulcanized rubber contained in said second sealing member is one selected from the group consisting of nitrile rubber (NBR), epichlorohydrin rubber (CO or ECO), acrylic rubber (ACM), urethane rubber (U) and fluoroelastomer (FKM).

8. A thermosetting highly foaming sealer according to claim 1, wherein a composition for said second sealing member employs a softener having a viscosity of 1000 cps. or more at 20° C. and 30 cps. or more at 100° C.

9. A thermosetting highly foaming sealer according to claim 1, wherein a composition for said second sealing member employs a foaming assistance agent.

10. A thermosetting highly foaming sealer according to claim 1, wherein a composition for said second sealing member employs an inorganic filler having a nodular shape of a particle size of from 1 to 10 micrometers.

11. A thermosetting highly foaming sealer according to claim 1, wherein each of two first sealing members is laminated on a top surface and a bottom surface of said second sealing member.

12. A thermosetting highly foaming sealer according to claim 11, wherein said first sealing member has chamfered portions at side ends thereof, and said second sealing member has projections engaging with said chamfered portions at side ends on said top surface and said bottom surface thereof.

13. A thermosetting highly foaming sealer according to claim 11, wherein said first sealing member has protruding walls at side ends thereof, and said second sealing member has chamfered portions engaging with said protruding walls at side ends thereof on said top surface and said bottom surface thereof.

14. A thermosetting highly foaming sealer according to claim 1, wherein either said first sealing member or said second sealing member is made distinguishable from each other by coloring or removing carbon.

15. A thermosetting highly foaming sealer according to claim 1, wherein said thermosetting highly foaming sealer is molded in a sheet shape.

16. A thermosetting highly foaming sealer according to claim 1, wherein said thermosetting highly foaming sealer is molded in a tape shape.

17. A thermosetting highly foaming sealer according to claim 1, wherein said thermosetting highly foaming sealer has a square-shaped cross-section.

18. A thermosetting highly foaming sealer according to claim 1, wherein said thermosetting highly foaming sealer has a rectangle-shaped cross-section.

19. A thermosetting highly foaming sealer according to claim 1, wherein a ratio of thickness of said first sealing member to thickness of said second sealing member is 0.5 or less.

20. A process for filling a gap formed between two parallel planes comprising the steps of:
   a first step of providing a thermosetting highly foaming sealer containing an unvulcanized rubber, a vulcanizing agent, a softener and an inorganic filler and comprising a first sealing member bonded on one of two parallel planes before heating and a second sealing member laminated on said first sealing member; and a second step of vulcanizing, foaming and expanding said first sealing member from 1 to 2 times of original volume thereof and said second sealing member 6 times or more of original volume thereof by heating, thereby filling said gap with said thermosetting highly foaming sealer.

21. A process for filling a gap formed between two parallel planes comprising the steps of:

a first step of providing a theremosetting highly foaming sealer containing an unvulcanized rubber, a vulcanizing agent, a softener and an inorganic filler and comprising a first sealing member bonded on one of two parallel planes before heating and a second sealing member laminated on said first sealing member; and a second step of performing electrodeposited coating on said two parallel planes; and a third step of vulcanizing, foaming and expanding said first sealing member from 1 to 2 times of original volume thereof and said second sealing member 6 times or more of original volume thereof by heating for drying electrodeposited coating, thereby filling said gap with said theremosetting highly foaming sealer.

* * * * *